United States Patent Office 3,464,950
Patented Sept. 2, 1969

3,464,950
SILOXANE ELASTOMERS
Karl-Heinrich Wegehaupt, Manfred Wick, and Siegfried Nitzsche, Burghausen, Bavaria, Germany, assignors to Wacker-Chemie G.m.b.H., Munich, Germany
No Drawing. Filed Dec. 24, 1964, Ser. No. 446,464
Claims priority, application Germany, Dec. 31, 1963, W 35,895
(Filed under Rule 47(a) and 35 U.S.C. 116)
Int. Cl. C08g *51/04, 31/09*
U.S. Cl. 260—37
31 Claims

ABSTRACT OF THE DISCLOSURE

This invention relates to a method for preparing organosiloxane rubber. This organosiloxane rubber is prepared employing a filler which is pretreated or treated in situ by reacting the filler with one or more organosilicon compounds in the presence of a phosphoronitrillic chloride catalyst. This product exhibits significantly improved tear strength without sacrifice of other physical properties.

---

This invention relates to a novel method for preparing elastomers based on organosiloxane polymers and more specifically it relates to a novel silicon rubber incorporating treated fillers and exhibiting improved tear strength and heat stability.

Elastomers based on organosiloxane polymers and frequently called silicone rubbers have been used extensively for some time. One of the outstanding properties of silicone rubbers is the retention of elastomeric properties and physical integrity over a wide temperature range from below −100° C. to over 250° C. Other outstanding and unique properties of silicone rubber include inertness and particularly physiological inertness, gas transmission through silicone rubber films, optical clarity of certain silicone rubber formulations, a wide range of pigmenting possibilites and a host of other attractive properties.

Needless to say, silicone rubber has not proved to be a perfect material. One of the serious problems encountered is the lack of substantial tear strength in such rubbers. The use of active or reinforcing fillers such as high surface area silicas has improved many of the physical properties of silicone rubber but it has not resulted in sufficient improvement in tear strength.

A further effort to improve the tear strength of silicone rubber involved treating the reinforcing silica fillers to alter their surfaces. The treated silica fillers increased the resistance to tearing in the silicone rubber. The treatments of the silicas consisted of reacting them with organosilanols or organosiloxanols in the presence of condensation catalysts and such treatment could be carried out before or after the silica fillers were mixed with the organosiloxane polymer but prior to the vulcanization step. The condensation catalysts employed to assist in the silica treatment were basic amino compounds and metal salts when the organosilanol or organosiloxanol was reacted with the filler after the filler had been mixed with the polymer. However, this method of treating the filler produced only minor improvement in the resistance to tearing exhibited by the ultimate rubber. Furthermore, even this minor improvement in tear strength disappeared after the rubber had been exposed to elevated temperatures for an extended period of time. Thus even the post-vulcanization cure of the rubber which is typically carried forward to improve other physical properties of the rubber frequently reduced the improved tear strength achieved with the treated fillers to the point where the improvement was negligible.

It is the primary object of this invention to produce a silicone rubber having significantly improved tear strength without sacrifice of other physical properties. A further object is a silicone rubber having improved heat stability and retention of tear strength after exposure to elevated temperatures for an extended period of time. A commercially attractive and improved method for treating fillers in situ, i.e., after incorporation of the filler into a silicone rubber stock, is also introduced. Other objects, advantages and unique features of this invention are detailed in or will be apparent from the disclosure and claims following.

This invention consists of a method for treating reinforcing or active fillers by (A) dispersing the filler in a diorganosiloxane polymer and thereafter (B) reacting (1) a filler with (2) one or more organosilicon compounds having an average of from 0.1 to 2.0 silicon bonded hydroxyl groups per silicon atom and 1 to 3 silicon bonded organic radicals per silicon atom, any remaining silicon valences being satisfied by oxygen atoms present as SiOSi linkages employing (3) phosphoronitrile chlorides as catalyst.

The active or reinforcing fillers employed herein are metallic oxides and particularly oxides of silicone and aluminum. The preferred fillers are silicas and aluminas. The active fillers have surface areas of at least 50 square meters per gram and may have surface areas of 900 square meters per gram or higher. There is no known upper limit on the surface area displayed by the active fillers employed herein. The surface area can be determined by the nitrogen absorption method as described in "ASTM Special Technical Bulletin," No. 51, pp. 95 ff., dated 1941.

The reinforcing or active fillers are preferably very finely divided with particle sizes below 10 microns. Best results are achieved with particles 0.1 to 10 microns in size range.

The silicas employed herein can be fumed silicas, silica hydrogels, dehydrated while maintaining the structure and known as silica aerogels and silica xerogels as well as precipitated silicas which may be hydrated, if desired, so long as they possess a surface area of at least 50 square meters per gram.

Amorphous alumina obtained by burning volatile aluminum compounds are useful as reinforcing fillers herein. Other aluminum oxides exhibiting the desired surface area and particle size are also useful herein.

The silica and alumina fillers employed display hydroxyl groups on the particle surfaces as HOSi and HOAl groups. These surface bonded hydroxyl groups react with organosilicon monomers and polymers having hydroxyl groups bonded to silicon.

The hydroxylated organosilicon compounds employed as treating agents for the silica and alumina fillers contain from 1 hydroxyl group per 10 silicon atoms to 2 hydroxyl groups per silicon atom in the form of HOSi≡ groups. The hydroxylated organosilicon compounds include monomeric silanols, linear and branched siloxanols, linear and branched silcarbanols as well as resinous siloxanes having residual hydroxyl groups within the range required herein. Mixtures of any of the organosilicon compounds noted above can be employed if desired.

The organosilanols employed herein are substituted with 0, 1, 2 or 3 organic radicals, represented by the symbol "R," as well as the 1–4 hydroxyl groups required. Thus such silanols have the general formula $R_nSi(OH)_{4-n}$ where $n$ is 0–3. The organosiloxanols are represented by the general unit formula $$R_x(HO)_y SiO_{\frac{4-x-y}{2}}$$

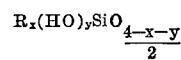

where $x$ has an average value from 0 to less than 3 and $y$ has an average value from 0.1 to 2.0. Thus the organosiloxanols employed herein have organic substituents "R" bonded to Si, hydroxyl substituents bonded to Si, and oxygen atoms bonded to Si as SiOSi linkages. Silcarbanols are also useful and are characterized by di-, tri- and polyvalent organic groups bonding adjacent silicon atoms in the molecule as in $SiCH_2Si$ and $SiC_6H_4Si$.

The radicals represented by R can be any monovalent hydrocarbon radical such as methyl, ethyl, isopropyl, tert-butyl, dodecyl, octadecyl, vinyl, allyl, octa-decenyl, butadienyl, cyclopentyl, cyclohexyl, cyclopentenyl, cyclohexadienyl, phenyl, benzyl, naphthyl, xenyl, xylyl and tolyl radicals as well as halogenated derivatives of such radicals including 3,3,3-trifluoropropyl,α-chloro-α,β,β-trifluorocyclobutyl, 1-bromovinyl-, 2,3-dibromocyclopentyl-, α,α-difluorobenzyl, perchlorophenyl, α,α,α-trifluorotolyl, 2,4,6-tribromobenzyl, perchlorovinyl, chlorobromoallyl, and chloromethyl. The organic substituents represented by R can also be composed of carbon, hydrogen and oxygen atoms which are present as ether linkages such as in $CH_3CH_2OCH_2CH_2$—, $CH_2$=$CHCH_2OCH_2CH_2$—, $C_6H_5CH_2OCH_2CH_2$—, $C_6H_5OCH_2CH_2$— and $CH_3CH_2OCH_2CH_2OCH_2CH_2$—.

The silcarbanols employed in this invention also have di,- tri- and/or polyvalent organic substituents such as
—$CH_2$—, —$CH_2CH_2$—, —$CH_2CH(CH_3)$—,
—$CH_2(CH_2)_6CH_2$—, —$CH_2CH(CH_3)CH_2$—,
—$CH_2C(CH_3)_2CH_2$—, —$CH_2CH_2OCH_2CH_2$—,
—$C_6H_4$—, —$C_6H_4CH_2C_6H_4$—, —$C_6H_4OC_6H_4$—,
—$C_{10}H_8$—, —$CH_2C_6H_4CH_2$—, —$CH_2(CF_3)CHCH_2$—,
—$CH_2CHBrO$—$CHBrCH_2$—, —$C_6H_3Cl$—,
—$C_6H_4CF_2C_6H_4$— and —$CH_2C_6F_4CH_2$— where the arylene nuclei can be bonded to the Si atom and can also be bonded to other substituents in the ortho-, meta- or para position and

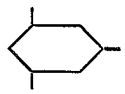

The preferred hydroxylated organosilicon compounds for use herein are trialkylsilanols particularly $(CH_3)_3SiOH$ arylalkylsilanols particularly $(C_6H_5)_2CH_3SiOH$, $C_6H_5(CH_3)Si(OH)_2$ and $C_6H_5(CH_3)_2SiOH$, arylalkenylsilanols particularly $(C_6H_5)_2CH_2$=$CHSiOH$ and silane diols such as $(C_6H_5)_2Si(OH)_2$, $(CH_3)_2Si(OH)_2$ and $C_6H_5(CH_3)Si(OH)_2$ as well as the siloxanols of relatively low molecular weight (i.e., not more than 20 Si atoms per polymeric molecule) corresponding to the silane diols noted. These low molecular weight siloxanols can be represented by the general formula $HO(R_2SiO)_yH$ where $y$ is 2–20 and R is preferably phenyl or methyl but can be any monovalent hydrocarbon or halogenohydrocarbon radical. Most preferably R represents phenyl and methyl radicals and the siloxanol has the general formula $HO[C_6H_5(CH_3)SiO]_yH$. These preferred siloxanols can have limited quantity, i.e., up to 20 mol percent but preferably not more than 10 mol percent, of $CH_3SiO_{3/2}$, $C_6H_5SiO_{3/2}$, $CH_3(HO)SiO$, and/or $C_6H_5(HO)SiO$ units per molecule. Particularly useful are methylphenylsiloxanols having 5.8 to 10% by weight of Si bonded hydroxyl groups, 80 to 100% of the Si atoms being substituted with one phenyl and one methyl radical and up to 20% of the Si atoms being substituted with one phenyl radical, all the remaining Si valences being satisfied by oxygen present as Si—O—Si linkages.

Many methods are known in the art for preparing the silanols and siloxanols employed herein. A particularly useful method for preparing the siloxanols and particularly the phenylmethylsiloxanols consists of adding 80 to 100 mol percent $C_6H_5(CH_3)SiCl_2$ and up to 20 mol percent $C_6H_5SiCl_3$ to sodium bicarbonate in an amount of at least one mol $NaHCO_3$ per mol of silicon bonded chlorine in the silanes. This reaction is carried forward in an organic solvent medium, particularly in methylene chloride. The reaction medium is preferably cooled to below —5° C. The organosiloxanols are recovered from the reaction mixture by any desired means.

The silane or silanes employed to prepare the siloxanols can be the commercially available chlorosilanes and the sodium bicarbonate can be the commercially available product. The methylene chloride must be dried prior to use but an ordinary siccative such as calcium chloride will accomplish the desired drying process.

All of the chlorine bonded to Si in the chlorosilanes should be removed by reaction hence at least 1 mol of sodium bicarbonate per mol of Cl bonded to silicon should be employed and it is preferred to employ an excess of sodium bicarbonate. Excellent results are achieved with 1.2 mols of $NaHCO_3$ per mol of Cl bonded to Si and a greater excess can be employed but to no advantage, although it is not detrimental to use a greater excess. Preferably 100–500 ml. of methylene chloride is employed per mol of sodium bicarbonate. The reaction is carried out with cooling of the mixture below —5° C. and best results are achieved at —10 to —20° C. The lower range of the reaction temperature is limited by the melting point of the reaction mixture.

It is preferred to mix the dried methylene chloride with the sodium bicarbonate and thereafter add the chlorosilane reactants. It is often useful to dilute the chlorosilanes with a portion of the methylene chloride before mixing with the sodium bicarbonate-methylene chloride mixture. The silane or silane mixture is added in portions or by slow, continuous portions to avoid a sudden violent reaction. The course of the reaction is readily measured by the development of carbon dioxide. The reaction can be carried out at any desired pressure and simplicity dictates the use of atmospheric pressure. Water in fluid form should be excluded from the reaction zone but atmospheric moisture can be present without deleterious effect. The reaction is terminated when there is no longer any gas formation and sodium chloride no longer precipitates from the reaction mixture. Of course, stirring is desirable as in any liquid-solid chemical reaction.

The desired organosiloxanols prepared by the above reaction are easily isolated from the reaction mixture. The sodium chloride and unreacted sodium bicarbonate are removed by filtration. The methylene chloride is removed by distillation. In distilling the methylene chloride from the filtrate, it is preferred to employ still temperatures not exceeding 70° C. and the pressure can be reduced, if desired, to 0.01–18 mm. of Hg with excellent results.

The active or reinforcing fillers having hydroxyl groups on the particle surfaces are incorporated into the silicone rubber stocks in known manner. The fillers are employed in amounts of from 10 to 200 parts by weight, preferably 20 to 60 parts by weight, for each 100 parts by weight of the diorganosiloxane polymer which is the basic ingredient of the rubber stock. The term "rubber stock" means the unvulcanized material including siloxane polymer, filler, vulcanizing agent, pigments and any other additives known for use in silicone rubber formulations.

The active filler, such as the commercially available fume silica having surface areas of 150–480 square meters per gram and average particle size below 10 microns, can be mixed with non-reinforcing fillers such as diatomaceous earths, asbestos fibers, and any other non-reinforcing fillers frequently employed in silicone rubber stocks.

The fillers are mixed into diorganosiloxane polymers employed and known for use in silicone rubber stocks. These elastomeric siloxane polymers are fully described in the prior art and are prepared by well-known methods.

They are essentially linear polymers containing at least 50 silicon atoms per polymeric molecule and preferably at least 150 silicon atoms per molecule. Minor amounts (i.e. up to 1 mol percent) of $RSiO_{3/2}$, $R_3SiO_{1/2}$ and $SiO_{4/2}$ units can be tolerated but the closer the polymer approaches 100 mol percent $R_2SiO$ units, exclusive of terminal units, the better the ultimate rubber. The terminal units can be such as $HOR_2SiO_{1/2}$, $R_3SiO_{1/2}$, $R_2ROSiO_{1/2}$ or $R_2(RCOO)SiO_{1/2}$ or other well-known endblocking groups. The linear siloxane polymers can also contain silcarbane linkages as in $SiC_6H_4Si$ units but it is preferred that such linkages should not be present in numerical proportions exceeding the number of SiOSi linkages present. Homopolymers, copolymers and mixtures can be employed herein with equal facility. Further identification of the operable polymers can be obtained by reference to patents such as U.S. Patents Nos. 2,842,516, 2,860,086, 2,999,077, 3,032,528, 3,050,490, 3,050,491, 3,061,578, 3,065,194, 3,070,559 3,070,566, 3,127,363, and 2,890,188.

The siloxane polymers which are the basic ingredient in the silicone rubber stocks has frequently been represented by the general unit formula $$R'_zSiO_{\frac{4-z}{2}}$$

where R' is a monovalent hydrocarbon or halogenated hydrocarbon radical, as these terms are defined and exemplified above, as well as cyanoalkyl radicals and z has an average value of from 1.99 to 2.01. When the preferred hydroxyl endblocking units are present the general formula is $$(HO)_a\left(R'_zSiO_{\frac{4-z}{2}}\right)_bH$$

where $a$ is 0.99 to 1.01, $z+a$ is 3.0 and $b$ is at least 50. These polymers vary from fluids of as low as 100 cs. viscosity at 25° C. to gum-like, solvent soluble polymers. The preferred polymers have viscosities exceeding 100,000 cs. at 25° C. with the gumlike, benzene soluble materials exceeding $10^6$ cs. at 25° C. being most preferred.

The radicals represented by R' are monovalent hydrocarbon and halogenohydrocarbon radicals as defined and exemplified above as well as cyanoalkyl radicals which, when present, should be bonded to at least 1 percent of the silicon atoms present. The R' radicals preferably contain 1–18 carbon atoms and it is well known that at least 50 percent of the R' radicals should be aliphatic hydrocarbon radicals of less than 5 carbon atoms and especially $CH_3$ radicals. The preferred substituents represented by R' are methyl, vinyl, phenyl and 3,3,3-trifluoropropyl radicals. The most preferred polymers are essentially dimethylsiloxane polymers with up to 15 mol percent diphenylsiloxane and/or phenylmethylsiloxane units and up to 0.2 mol percent, preferably 0.1 to 0.2 mol percent, of methylvinylsiloxane units.

The diorganosiloxane polymers are, of course, free of the condensation agents employed in their preparation. Such agents or their derivatives formed during condensation may react with the phosphoronitrilechloride with undesirable results. Deleterious materials such as alkali compounds frequently employed as condensation agents are usually not present in commercial silicone rubber stocks but their presence is to be avoided herein.

The preferred phosphoronitrilechlorides are the polymeric products which are obtainable from the reaction of phosphoropentachloride with ammonium chloride according to "Berichte der deutschen Chemischen Gesellshaft" (1924), p. 1345/1346 or "Journal of the Chemical Society" (1960), pp. 2542 to 2547. Especially suitable are the oily, linear polymeric phosphoronitrilechlorides.

The phosphoronitrilechlorides are preferably used in quantities of 0.0002 to 2% calculated on the weight of the active filler. However, smaller or larger quantities can also be used.

The phosphoronitrilechlorides can be used in the form of their solutions in an inert solvent if desired, e.g., methylene chloride.

The reaction of the organosilicon compounds displaying an average of 0.1 to 2 Si-bonded hydroxyl groups per Si atom, with the active fillers can be carried out before mixing with the diorganopolysiloxanes hardenable to elastomers. It is carried out by mixing the reaction components with the condensation agents used according to the present discovery, if desired in inert solvents, that is solvents not reacting with Si-bonded HO groups or with phosphoronitrilechlorides, for example hydrocarbons such as benzene, toluene, xylene or petroleum ether; halogen hydrocarbons such as methylene chloride, perchloroethylene or chlorobenzene; ethers such as diethylether and di-n-butyl ether, as well as ketones, such as methyl isobutyl ketone at temperatures between room temperature and 180° C.

Preferably the reaction of the organosilanol or organosiloxanol with the active fillers in the presence of the phosphoronitrilechlorides takes place only after the mixing with the diorganopolysiloxanes hardenable to elastomers, but before the hardening of the mixtures thus obtained into elastomers. According to this preferred practice for the present discovery, the mixtures of organosiloxanol or organosilanol, active filler, phosphoronitrilechloride and diorganopolysiloxane hardenable to elastomers are allowed to stand for at least 8 days at about room temperature before adding the vulcanizing agent, i.e., in the absence of the vulcanizing agent which is to convert them to an elastomer, or in the presence of this vulcanizing agent but before its activation, and is then first molded in the form desired of the elastomer and vulcanized in the known manner. If desired, the storage at room temperature can be replaced by heating to 60–180° C. for at least 1 minute. In contrast to the previous known methods of preparing tear-resistant organopolysiloxane elastomers such heating is not necessary with the condensation catalysts used according to the present discovery, which presents a considerable advantage. It is also not necessary to allow the mixture to stand much longer than 8 days before curing it to an elastomer.

If desired, the reaction of the organosilanol or organosiloxanol with the active filler in the presence of phosphoronitrilechloride can take place by keeping the mixtures in motion on a rolling mill for example, and/or in the presence of volatile organic solvents which are inert (that is, they do not react with the above materials) if heat is used concurrently. Examples of inert solvents are aliphatic hydrocarbons such as pentane, hexane, and heptane; aromatic hydrocarbons such as benzene and toluene as well as ethers such as di-n-butylether. The succession in which the mixture components are added is immaterial if the addition of all mixture components takes place within a short period of time, for example, within not more than 5 hours. Preferably the organosilanol or organosiloxanol is mixed with the diorganopolysiloxanes hardenable to elastomers, when these are already mixed with the condensation agent, but only after the addition of at least a part of the active filler. The reaction is generally carried out at normal pressure.

The mixtures of active fillers, which were reacted with the organosiloxanol or organosilanol in the presence of the phosphoronitrilechloride, and diorganopolysiloxanes hardenable to elastomers, can be hardened in any known manner. Hardening with heat-activated organic peroxide curing agents such as benzoyl peroxide, dicumyl peroxide, tert.-butylperbenzoate and dichlorobenzoyl peroxide is preferred. However, other heat-activated hardening agents such as azoisobutyronitrile or sulfur, in mixture with organic sulfur compounds such as tetramethylthiuramdisulfide or other vulcanization agents based on sulfur can also be used. Furthermore, curing agents effective at room temperature can also be employed, e.g., combinations of silicates and polysilicates such as methylorthosilicate, ethylorthosilicate and ethylpolysilicate, methyltrimethoxysilane and other organotrialkoxysilanes as well as partial hydrolyzates of such organotrialkoxysilanes or of organosiloxanes displaying an average of at least 3 Si-bonded hydrogen atoms per molecule, such as methylhydrogenpolysiloxane, with salts of carboxylic acids and metals or organometals such as lead-2-ethylhexoate and dibutyltindilaurate, or triacyloxyorganosilanes such as methyltriacetoxysilane, likewise in combination with condensation catalysts, if desired, such as the salts named. When using the above diorganopolysiloxanes hardenable to elastomers which contain vinyl groups, the hardening can be carried out at room temperature with combinations of organosiloxanes displaying an average of at least 3 Si-bonded hydrogen atoms per molecule, e.g., methylhydrogenpolysiloxane, with platinum catalysts, e.g., $PtCl_4$, $H_2PtCl_6$ and $PtO_2$. The hardening may also be carried out with ionizing radiation, such as $\alpha$-, $\beta$-, $\gamma$- or Röntgen rays.

In the method of the present discovery other common additives can be used during the preparation of the organopolysiloxane elastomers, viz., those for increasing heat stability, inhibiting permanent deformation, as well as dyes and pigments, in addition to the above materials.

The organopolysiloxane elastomers obtained according to the present discovery can be employed anywhere where organopolysiloxane elastomers have hitherto been incorporated, for example in the preparation of tubes, seals and electrical insulation; as well as anywhere where elastomers with great tear resistance, retaining their elastic properties over a wide temperature range, are required.

The hydroxyl group content given in the following examples was always calculated by determining the active hydrogen according to the methods of Tschugaeff-Zerewitinoff. The phosphoronitrilechloride used in the following examples was obtained according to "Berichte der deutschen Chemischen Gesellschaft" (1924), p. 1345, by heating 400 g. phosphoropentachloride with 130 g. of ammonium chloride in 1,000 ml. tetrachloroethylene to 135° C. until the termination of gas development. Determination of the tear strength was done by German Industrial Standard No. 53,507.

Example 1

(a) A mixture of 500 ml. methylene chloride dried over $CaCl_2$ and 190 g. sodium bicarbonate was cooled to —15° C. by external means in a 1,000 ml. 3-neck flask equipped with stirrer, dropping funnel and gas outlet. 190 g. of phenylmethyldichlorosilane was added to this mixture in dropwise fashion through the dropping funnel while stirring and maintaining the temperature of —15° C. After the gas development had stopped, the separated sodium chloride as well as the unreacted sodium bicarbonate were filtered and the methylene chloride was distilled off from the filtrate by heating to 70° C. The residue had a viscosity of 750 cs./25° C. and contained 7.1% by weight of Si-bonded hydroxyl groups.

(b) 100 g. of a diorganopolysiloxane having one hydroxyl group in each terminal unit consisting of 99.85 mol percent dimethylsiloxane and 0.15 mol percent of methylvinylsiloxane units with a Williams plasticity of 1.5 cm., corresponding to about $20 \times 10^6$ cs./25° C. was mixed in the order given with 0.1 g. of phosphoronitrilechloride in the form of a 25% by weight solution in methylene chloride, 5 g. of a fume silica having a surface area of 180 m.²/g., 7.5 g. of the organosiloxanol prepared as described in part (a) of this example and 45 g. of the silica described. The silicone rubber stock thus obtained was left to stand at room temperature for 8 days then mixed with 12.5 g. dicumyl peroxide for vulcanizing and heated to 158° C. for 7 minutes at a pressure of 200 kg./cm.². The elastomer thus obtained was heated in an air circulating oven for 12 hrs. to 150° C. and for 12 hrs. to 200° C. The elastomers possess the following properties:

Tensile strength _____ 100 kg./cm.², 1,420 p.s.i.
Breaking elongation _____ 580%.
Tear strength _____ 75 kg./cm., 420 p.p.i.
Shore hardness _____ 58.

Example 2

(a) A mixture of 500 ml. of methylene chloride dried over $CaCl_2$ and 200 g. sodium bicarbonate was cooled to —15° C. in a 1,000 ml. 3-neck flask equipped with stirrer, dropping funnel and gas outlet. A mixture of 170 g. of phenylmethyldichlorosilane and 20 g. phenyltrichlorosilane was added to this mixture in dropwise fashion through the dropping funnel while stirring and maintaining the temperature at —15° C. After the gas development had terminated the separated sodium chloride and the unreacted sodium bicarbonate were filtered and the filtrate was freed of methylene chloride at an ambient temperature of the flask of 20° C. by applying a vacuum of 1 mm. Hg (abs.). The residue had a viscosity of 1,200 cs./25° C. and contained 8.2% by weight of Si-bonded hydroxyl groups.

(b) 100 g. of the diorganopolysiloxane described in Example 1 having a Williams plasticity of about 1.5 cm. was mixed on a 2-roll mixer with 10 g. of the organosiloxanols prepared as described in part (a) of this example, then with 40 g. of a fume silica with a surface area of 380 m.²/g., then with 0.01 g. phosphoronitrilechloride in the form of a 25% by weight solution in methylene chloride and finally with 9 g. of a paste of equal parts by weight of 2,4-dichlorobenzoyl peroxide and a trimethylsiloxy endblocked dimethylpolysiloxane of 250 cs./25° C. The material thus obtained was left to stand for 8 days then heated to 120° C. under a pressure of 200 kg./cm.² for 5 minutes to vulcanize it. The elastomers obtained were heated for 12 hrs. to 150° C. and 12 hrs. to 200° C. in an air circulating oven. The elastomers then exhibited the following properties:

Tensile strength _____ 110 kg./cm.², 1,560 p.s.i.
Breaking elongation _____ 750%.
Tear strength _____ 70 kg./cm., 391 p.p.i.
Shore hardness _____ 48.

Example 3

Diphenylsilanediol was used in place of the organosiloxanol in the procedure according to part (b) of Example 2. The elastomer obtained thereby had the following properties after the post-heating:

Tensile strength _____ 95 kg./cm.², 1,350 p.s.i.
Breaking elongation _____ 700%.
Tear strength _____ 55 kg./cm., 308 p.p.i.
Shore hardness _____ 45.

As shown by comparison with the corresponding values given in British Patent No. 881,789, elastomers which display considerably higher tear strength even after the prolonged heating which is applied in the so-called heat aging are obtained from the method of the present discovery without heating the masses for many hours before hardening them to elastomers. This is also true when diphenylsilanediol is employed to treat the reinforcing filler.

Example 4

Equivalent results are achieved when the silica filler of Example 3 is replaced with an alumina filler having a surface area of 150 m.²/g.

Example 5

Equivalent results are achieved when the polymer of Example 3 is replaced by any one of the following: a copolymer of 90 mol percent $(CH_3)_2SiO$ units, 9.9 mol percent $C_6H_5(CH_3)SiO$ units and 0.1 mol percent $CH_3(CH_2=CH)SiO$ units endblocked by $(CH_3)_3SiO_{1/2}$ units and having a viscosity of from 100,000 to 1,000,000 cs. at 25° C.; a copolymer of 50 mol percent $(CH_3)_2SiO$ units and 50 mol percent $CH_3(F_3CCH_2CH_2)SiO$ units endblocked with HO groups and having a viscosity of 20,000–150,000 cs. at 25° C.; and a block copolymer of 50 mol percent of blocks of $(CH_3)_2SiO$ units and 50 mol percent $(CH_3)_2SiC_6H_4Si(CH_3)_2$ units having a viscosity of 10,000–150,000 cs. at 25° C.

It is noted that the organosilanol or organosiloxanol is employed in proportions such that at least 1% by weight, and preferably 10–60% by weight, of the organosilanol or organosiloxanol is present based on the weight of the active silica or alumina filler.

That which is claimed is:

1. A silicone rubber stock consisting essentially of 100 parts by weight of an essentially linear diorganosiloxane polymer of at least 100 cs. viscosity at 25° C. wherein the organic substituents contain less than 19 carbon atoms and are selected from the group consisting of monovalent hydrocarbon and halogenohydrocarbon radicals and cyanoalkyl radicals, 10 to 200 parts by weight of a reinforcing filler selected from the group consisting of silicas and aluminas having surface areas of at least 50 m.²/g., said filler being treated by reacting with 0.1 to 120 parts by weight of a hydroxylated organosilicon compound selected from the group consisting of organosilanols and organosiloxanols wherein the HO/Si ratio varies from 0.1/1 to 2/1, the organic substituents are selected from the group consisting of monovalent, divalent and trivalent hydrocarbon, halogenohydrocarbon and radicals composed of carbon, hydrogen and oxygen atoms wherein the oxygen is present as ether linkages, the organic substituent to silicon ratio being from 0/1 up to 3/1 in the presence of 0.0002 to 2.0 parts by weight per 100 parts of reinforcing filler, of phosphoronitrilechloride.

2. The method of preparing an organosiloxane elastomer comprising
    (A) admixing
        (1) an essentially diorganosiloxane polymer with
        (2) an active filler said filler being treated by reacting in the presence of a phosphoronitrilechloride with a hydroxylated organosilicon compound containing an average of from 0.1 to 2 hydroxyl groups per silicon atom bonded to Si to form HOSi groups and containing an average of from 1 to 3 organic radicals per silicon atom, any remaining silicon valences being satisfied by oxygen atoms present as SiOSi linkages and thereafter
    (B) vulcanizing the mixture from (A).

3. The method of claim 2 further characterized in that the mixture obtained in (A) stored at room temperature for at least 8 days prior to the vulcanizing step (B).

4. The method of treating a filler selected from the group consisting of aluminas and silicas having surface areas of at least 50 m.²/g. comprising reacting said filler with a hydroxylated organosilicon compound selected from the group consisting of silanols of the general formula $R_nSi(OH)_{4-n}$, where $n$ is 0–3 and R is a monovalent hydrocarbon radical and siloxanols of average unit formula

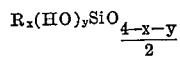

where R is as above defined, $x$ has an average value from 0 to 3, $y$ has an average value from 0.1 to 2.0 and $x+y$ is less than 4.

5. A silicon rubber stock consisting essentially of 100 parts by weight of an organosiloxane polymer of the average unit formula

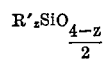

where each R' is a monovalent substituent of less than 19 carbon atoms selected from the group consisting of hydrocarbon, halogenohydrocarbon and cyanoalkyl radicals, $z$ has an average value of from 1.99 to 2.01, said polymer having a viscosity of at least 100 cs. at 25° C., 20 to 60 parts by weight of an active filler selected from the group consisting of aluminas and silicas having surface areas of at least 50 square meters per gram, said filler being treated by reacting with 10 to 60% by weight based on the weight of active filler present of a hydroxylated organosilicon compound selected from the group consisting of organosilanols of the general formula $R_nSi(OH)_{4-n}$ where $n$ is 0 to 3 and R is a monovalent hydrocarbon radical and organosiloxanols of the average unit formula

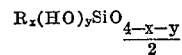

where R is as above defined, $x$ has an average value of from 0 to 3, $y$ has an average value from 0.1 to 2 and $x+y$ is less than 4.

6. The silicone rubber stock of claim 5 further characterized in that R' is methyl.

7. The silicone rubber stock of claim 5 further characterized in that R' is methyl and phenyl.

8. The silicone rubber stock of claim 5 further characterized in that R' is methyl, phenyl and vinyl.

9. The silicone rubber stock of claim 5 further characterized in that the active filler is a silica.

10. The silicone rubber stock of claim 5 further characterized in that the active filler is an alumina.

11. The silicone rubber stock of claim 6 further characterized in that the active filler is a silica.

12. The silicone rubber stock of claim 7 further characterized in that the active filler is a silica.

13. The silicone rubber stock of claim 8 further characterized in that the active filler is a silica.

14. The silicone rubber stock of claim 6 further characterized in that hydroxylated organosilicon compound is a hydroxylated phenylmethylsiloxane containing 5.8 to 10% by weight of silicon-bonded hydroxyl groups.

15. The silicone rubber stock of claim 6 further characterized in that the hydroxylated organosilicon compound is a silanol.

16. The silicone rubber stock of claim 15 wherein the silanol is $(CH_3)_3SiOH$.

17. The silicone rubber stock of claim 15 wherein the silanol is $(C_6H_5)_2CH_3SiOH$.

18. The silicone rubber stock of claim 15 wherein the silanol is $C_6H_5(CH_3)_2SiOH$.

19. The silicone rubber stock of claim 15 wherein the silanol is $(C_6H_5)_2CH_2{=}CHSiOH$.

20. The silicone rubber stock of claim 15 wherein the silanol is $(CH_3)_2Si(OH)_2$.

21. The silicone rubber stock of claim 15 wherein the silanol is $(C_6H_5)_2Si(OH)_2$.

22. The silicone rubber stock of claim 15 wherein the silanol is $C_6H_5(CH_3)Si(OH)_2$.

23. The method of preparing a silicone rubber containing a treated active filler and exhibiting superior tear strength after vulcanization comprising
    (A) admixing
        (1) 100 parts by weight of an essentially linear benzene soluble diorganosiloxane of at least 100 cs. viscosity at 25° C. of the general formula

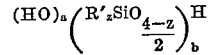

where $a$ has an average value from .99 to 1.01, $z$ has an average value from 1.99 to 2.01, the sum of $a+z$ is 3.0, $b$ has a value of at least 50 and each R' is a monovalent substituent selected from the group consisting of hydrocarbon radicals, halogenohydrocarbon radicals and cyanoalkyl radicals of 1 to 18 carbon atoms, with
        (2) 20 to 60 parts of an active filler selected from the group consisting of aluminas and silicas having a surface of at least 50 m.²/g. and exhibiting surface OH groups and
(3) the filler being treated by reaction with 10 to 60% by weight based on the weight of the filler of a hydroxyl containing organosilicon compound selected from organosilanols and organosiloxanols having an OH/Si ratio of from 0.1/1 to 2.0/1, having an organic substituent to silicon ratio of from 0/1 to 3/1, any remaining silicon valences being satisfied by oxygen in the form of SiOSi siloxane linkages, the organic substituents being selected from the group consisting of mono-, di- and trivalent hydrocarbon radicals, halogenohydrocarbon radicals and radicals composed of C, H and O, the oxygen being present as C—O—C linkages in the presence of
(4) .0002 to 2 percent by weight based on the weight of filler (3) of a phosphoronitrilechloride,
(B) storing the mixture from (A) for at least 8 days at room temperature,
(C) admixing a vulcanizing agent with the mixture from (A) after said storage (B) and thereafter
(D) effecting vulcanization of the mixture from (C).

24. The method of claim 23 where R' is $CH_3$.

25. The method of claim 23 where R' is $CH_3$ and $C_6H_5$.

26. The method of claim 23 where R' is $CH_3$, $C_6H_5$ and $CH_2=CH-$.

27. The method of claim 23 where R' is $CH_3$ and $CH_2=CH-$.

28. The method of claim 23 where the active filler is a silica.

29. The method of claim 23 where the hydroxyl containing organosilicon compound is an organosilanol of the general formula $R_nSi(OH)_{4-n}$ where $n$ is 0–3 and R is a monovalent hydrocarbon radical.

30. The method of claim 23 where the hydroxyl containing organosilicon compound is an organosiloxanol of the average unit formula

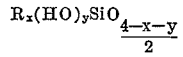

where $x$ has an average value from 0 to 3, $y$ has an average value from 0.1 to 2.0, the sum of $x+y$ is less than 4 and R is a monovalent hydrocarbon radical.

31. The method of claim 30 where R is phenyl and methyl, $x$ is 2, $y$ is 0.1 to 1.0 and the siloxanol contains an average of from 2 to 20 silicon atoms per polymeric molecule.

References Cited

UNITED STATES PATENTS 3,377,311    4/1968    Roch _____ 260—37

FOREIGN PATENTS 930,481    7/1955    Germany.

MORRIS LIEBMAN, Primary Examiner

L. T. JACOBS, Assistant Examiner

U.S. Cl. X.R.

260—46.5